P. A. REED.
BEARING.
APPLICATION FILED MAR. 5, 1915.

1,249,196.

Patented Dec. 4, 1917.

Witnesses
Chas. H. Trotter
Robt. Meyer.

Inventor
P. A. Reed
By
Attorney

UNITED STATES PATENT OFFICE.

PETER A. REED, OF ILLMO, MISSOURI.

BEARING.

1,249,196.  Specification of Letters Patent.  Patented Dec. 4, 1917.

Application filed March 5, 1915. Serial No. 12,371.

*To all whom it may concern:*

Be it known that I, PETER A. REED, a citizen of the United States, residing at Illmo, in the county of Scott and State of Missouri, have invented certain new and useful Improvements in Bearings; and I do hereby declare the following to be a full, clear, and exact description of the invention, such as will enable others skilled in the art to which it appertains to make and use the same.

This invention relates to bearings, and more particularly to what is commonly known as journal brasses, and the primary object of the invention is to provide a journal bearing which is adaptable for attachment to any suitable type of journal boxes commonly in use, without necessitating alteration to the boxes, and which is constructed so as to prevent movement in a rotary manner of the bearing upon extraordinary strain.

Another object of this invention is further, to provide a bearing brass which is provided with a substantially semi-circular bearing recess or opening formed therein, and which is bounded by arcuate arms that terminate in a dove-tail longitudinally extending extension for slidably seating a dove-tailed pillow block.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1:
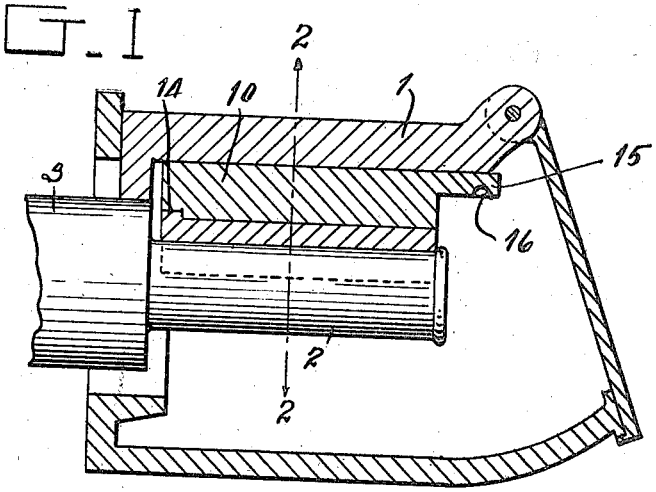
Figure 3:
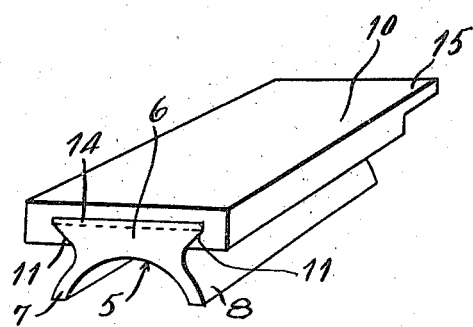
Figure 2:
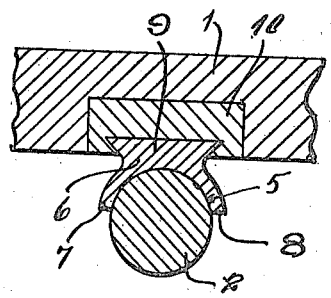
Figure 4:
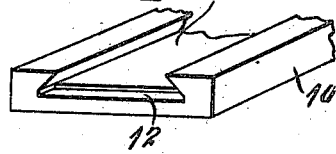

Figure 1 is a section through the improved bearing, showing the same applied to a car journal, Fig. 2 is a cross sectional view on the line 2—2 of Fig. 1, Fig. 3 is a detail perspective view of the improved bearing, and Fig. 4 is an inverted perspective view of the pillow block.

Referring more particularly to the drawings, 1 designates an ordinary journal box used upon various types of cars for rotatably supporting the journals 2 of the axles 3 of the same. The journal 2 rotates in bearings 5, which is formed in the bearing brass or block 6. The brass or block 6 has arcuate depending sides 7 and 8, the inner surfaces of which are shaped to conform to the configuration of the journal 2. The arms or sides 7 and 8 have a dove-tail extension or projection 9 formed upon their upper ends, which extends longitudinally of the bearing throughout its entire length, for slidably connecting the bearing to a pillow block 10. The pillow block 10 is provided with a dove-tail recess 11 formed in its lower face, which is enlarged at one end of the pillow block, as is shown at 12, and is provided for the reception of the transversely extending lug 14, which is formed upon the end of the dove-tail extension or projection 9 formed upon the bearing block 6, for preventing independent longitudinal movement of the bearing block or brass 6 with respect to the pillow block 10. The pillow block 10 has a projection 15 formed upon and extending longitudinally from one end thereof, which projection is provided with a facial recess 16 for facilitating the removal of the pillow block from the journal box.

While in the foregoing description and the drawings, the improved journal brass or bearing has been illustrated and described as for use in car journals, it is to be understood that the same may be used in any type of journal box commonly upon the market, without departing from the spirit of this invention.

In reducing the invention to practice, certain minor features of construction, combination, and arrangement of parts may necessitate alteration to which the patentee is entitled provided such alterations are comprehended within the scope of what is claimed.

What is claimed is:—

In a journal bearing, a pillow block provided with a longitudinally extending dove-tail recess, a semi-cylindrical bearing brass, a dove-tail projection formed upon and extending longitudinally along the convex surface of the bearing brass, said pillow block provided with a transversely extending enlargement of said recess at its rear end, a transverse upstanding rib formed upon said dove-tail projection and seated in said enlargement for preventing endwise movement of the bearing brass independently of the pillow block, a forwardly extending projection formed upon the outer end of the pillow block and provided with a finger receiving recess in its under surface, the ends of said bearing brass being flush with the ends of said pillow block.

In testimony whereof I affix my signature in presence of two witnesses.

PETER A. REED.

Witnesses:
J. J. CRAIG,
MAURICE CRAIG.

Copies of this patent may be obtained for five cents each, by addressing the "Commissioner of Patents, Washington, D. C."